US012000608B2

United States Patent
Willmott et al.

(10) Patent No.: US 12,000,608 B2
(45) Date of Patent: Jun. 4, 2024

(54) CENTRAL PLANT CONTROL SYSTEM WITH SETPOINTS MODIFICATION BASED ON PHYSICAL CONSTRAINTS

(71) Applicant: Johnson Controls Technology Company, Auburn Hills, MI (US)

(72) Inventors: Graeme Willmott, West Milwaukee, WI (US); Jared W. Fread, Milwaukee, WI (US); Matthew J. Asmus, Watertown, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 227 days.

(21) Appl. No.: 16/046,971

(22) Filed: Jul. 26, 2018

(65) Prior Publication Data

US 2019/0032945 A1 Jan. 31, 2019

Related U.S. Application Data

(60) Provisional application No. 62/537,680, filed on Jul. 27, 2017.

(51) Int. Cl.
*F24F 11/49* (2018.01)
*F24F 11/58* (2018.01)
(Continued)

(52) U.S. Cl.
CPC ............. *F24F 11/49* (2018.01); *F24F 11/58* (2018.01); *F24F 11/64* (2018.01); *F24F 11/65* (2018.01);
(Continued)

(58) Field of Classification Search
CPC .................. F24F 2221/54; F24F 11/49; G05B 2219/23199; G05B 2219/2614
See application file for complete search history.

(56) References Cited

U.S. PATENT DOCUMENTS 8,903,554 B2    12/2014 Stagner
9,447,985 B2     9/2016 Johnson
(Continued)

FOREIGN PATENT DOCUMENTS

CA    2957726 A1    3/2016
CA    3043996 A1    2/2018
(Continued)

OTHER PUBLICATIONS

Wang, Handong. Water flow rate models based on the pipe resistance and pressure difference in multiple parallel chiller systems. 2014. ScienceDirect. Energy and Buildings. pp. 181-188. (Year: 2014).*

(Continued)

*Primary Examiner* — Robert E Fennema
*Assistant Examiner* — Vi N Tran
(74) *Attorney, Agent, or Firm* — Foley & Lardner LLP

(57) ABSTRACT

Disclosed herein are a system, method, and non-transitory computer readable medium for operating an energy plant. In one aspect, a system determines a ratio of flow rates between devices of the energy plant connected in parallel with each other in a branch. The system generates a candidate set of operating parameters of the devices according to the ratio of flow rates. The system predicts thermodynamic states of the devices operating according to the candidate set of operating parameters. The system determines whether the predicted thermodynamic states satisfy constraints of the devices. The system determines whether the predicted thermodynamic states satisfy a target thermal energy load of the branch based on the ratio of the flow rates. The system operates the energy plant according to the candidate set of operating parameters, in response to determining that the predicted thermodynamic states satisfy the constraints and the target thermal energy load.

21 Claims, 7 Drawing Sheets

(51) Int. Cl.
    *F24F 11/64*     (2018.01)
    *F24F 11/65*     (2018.01)
    *F24F 140/50*     (2018.01)
    *G05B 13/04*     (2006.01)
    *G05B 15/02*     (2006.01)

(52) U.S. Cl.
CPC ......... *G05B 13/042* (2013.01); *G05B 13/048* (2013.01); *G05B 15/02* (2013.01); *F24F 2140/50* (2018.01); *F24F 2221/54* (2013.01); *G05B 2219/2642* (2013.01)

(56) References Cited

U.S. PATENT DOCUMENTS

| | | | |
|---|---|---|---|
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 2003/0055798 A1 | 3/2003 | Hittle et al. | |
| 2006/0036417 A1* | 2/2006 | Wu | G06F 30/20 703/9 |
| 2013/0013121 A1* | 1/2013 | Henze | G06Q 10/04 700/291 |
| 2013/0238149 A2* | 9/2013 | Yasni | F22B 35/18 700/286 |
| 2015/0316902 A1* | 11/2015 | Wenzel | G06Q 50/06 700/291 |
| 2017/0314800 A1* | 11/2017 | Bengea | F24F 11/30 |

FOREIGN PATENT DOCUMENTS

| | | |
|---|---|---|
| EP | 1 156 286 A2 | 11/2001 |
| EP | 3 186 687 A4 | 7/2017 |
| EP | 3 497 377 A1 | 6/2019 |
| JP | 2000039348 A * | 2/2000 |
| WO | WO-2012/161804 A1 | 11/2012 |
| WO | WO-2013/130956 A1 | 9/2013 |

OTHER PUBLICATIONS

Machine Translation for JP-2000039348-A, obtained Dec. 2021 (Year: 2021).*
Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
Diederik Kingma and Jimmy Ba. Adam: A Method for Stochastic Optimization. In International Conference on Learning Representations (ICLR), 2015, 15 pages.
George EP Box, Gwilym M Jenkins, Gregory C Reinsel, and Greta M Ljung. Time Series Analysis: Forecasting and Control. John Wiley & Sons, 2015, chapters 13-15. 82 pages.
Jie Chen and Guoxiang Gu. Control-oriented System Identification: an H1 Approach, vol. 19. Wiley-Interscience, 2000, chapters 3 & 8, 38 pages.
Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.
K. J. Astrom. Optimal Control of Markov Decision Processes with Incomplete State Estimation. J. Math. Anal. Appl., 10:174-205, 1965.31 pages.
Kelman and F. Borrelli. Bilinear Model Predictive Control of a HVAC System Using Sequential Quadratic Programming. In Proceedings of the 2011 IFAC World Congress, 2011, 6 pages.
Lennart Ljung and Torsten Soderstrom. Theory and practice of recursive identification, vol. 5. JSTOR, 1983, chapters 2, 3 & 7, 80 pages.
Lennart Ljung, editor. System Identification: Theory for the User (2nd Edition). Prentice Hall, Upper Saddle River, New Jersey, 1999, chapters 5 and 7, 40 pages.
Moritz Hardt, Tengyu Ma, and Benjamin Recht. Gradient Descent Learns Linear Dynamical Systems. arXiv preprint arXiv:1609. 05191, 2016, 44 pages.
Nevena et al. Data center cooling using model-predictive control, 10 pages.
Sergio Bittanti, Marco C Campi, et al. Adaptive Control of Linear Time Invariant Systems: The "Bet on the Best" Principle. Communications in Information & Systems, 6(4):299-320, 2006. 21 pages.
Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Coolinglogic, "CoolingLogic: Up early, saving billions." URL: http://coolinglogic.com/documents/MarketingFlyer_FINAL_HiRes8. 5x11.pdf, retrieved from internet Oct. 27, 2022 (1 page).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-

(56) References Cited

OTHER PUBLICATIONS

Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System-Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System-JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation Gui," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Kelman et al., "Analysis of Local Optima in Predictive Control for Energy Efficient Buildings," Journal of Building Performance Simulation, Apr. 16, 2012, vol. 6, No. 3 (pp. 236-255).

Koehler et al., "Building Temperature Distributed Control via Explicit MPC and 'Trim and Respond' Methods," European Control Conference (ECC), Jul. 17-19, 2013, Zurich, Switzerland (pp. 4334-4339).

Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).

McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).

Mossolly et al., "Optimal Control Strategy for a Multizone Air Conditioning System Using a Genetic Algorithm," Energy, Jan. 2009, vol. 34, No. 1 (pp. 58-66).

Nassif et al., "Optimization of HVAC Control System Strategy Using Two-Objective genetic Algorithm," International Journal of HVA C&R Research, vol. 11, No. 3 (pp. 459-486).

Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).

Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).

Strurznegger, D., "Model Predictive Building Climate Control, Steps Towards Practice," Doctoral Thesis, Automatic Control Laboratory, Zurich, Switzerland, 2014 (176 pages).

(56) References Cited

OTHER PUBLICATIONS

Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).

\* cited by examiner

CENTRAL PLANT CONTROL SYSTEM WITH SETPOINTS MODIFICATION BASED ON PHYSICAL CONSTRAINTS

CROSS-REFERENCE TO RELATED PATENT APPLICATION

This application claims the benefit of U.S. Provisional Patent Application No. 62/537,680, filed Jul. 27, 2017, which is incorporated herein by reference in its entirety.

BACKGROUND

The present disclosure relates generally to the operation of a central plant for serving building thermal energy loads. The present disclosure relates more particularly to systems and methods for optimizing the operation of one or more subplants of a central plant.

A heating, ventilation and air conditioning (HVAC) system may include various types of equipment configured to serve the thermal energy loads of a building or building campus. For example, a central plant may include HVAC devices such as heaters, chillers, heat recovery chillers, cooling towers, or other types of equipment configured to provide heating or cooling for the building. Some central plants include thermal energy storage configured to store the thermal energy produced by the central plant for later use.

A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling for the air. The working fluid then returns to the central plant to receive further heating or cooling and the cycle continues.

Controlling the central plant includes determining a set of operating parameters of the HVAC devices. In particular, some HVAC device operates according to a selected operating parameter from a range of operating parameters. Examples of the operating parameters include operating capacity (e.g., 50% capacity) of corresponding HVAC devices. Determining a set of operating parameters includes, for a candidate set of operating parameters, predicting thermodynamic states (e.g., pressure values, temperatures values, mass flow values, etc.) of different HVAC devices in operation together.

SUMMARY

Various embodiments of a controller for an energy plant including heating, ventilation, air conditioning (HVAC) devices are disclosed herein. The controller includes a processing circuit comprising a processor and memory storing instructions executed by the processor. The processing circuit is configured to determine a ratio of flow rates between two or more of the HVAC devices of the energy plant connected in parallel with each other in a branch. The processing circuit is configured to generate a candidate set of operating parameters of the two or more of the HVAC devices according to the ratio of the flow rates. The processing circuit is configured to predict thermodynamic states of the two or more of the HVAC devices operating according to the candidate set of operating parameters. The processing circuit is configured to determine whether the predicted thermodynamic states satisfy constraints of the two or more of the HVAC devices. The processing circuit is configured to determine whether the predicted thermodynamic states satisfy a target thermal energy load of the branch based on the ratio of the flow rates. The processing circuit is configured to operate the energy plant according to the candidate set of operating parameters, in response to determining that the predicted thermodynamic states satisfy the constraints and the target thermal energy load.

In one or more embodiments, the constraints include a first temperature threshold of one of the two or more of the HVAC devices and a second temperature threshold of the one of the two or more of the HVAC devices. The first temperature threshold may be higher than the second temperature threshold.

In one or more embodiments, in response to determining that the predicted thermodynamic states do not satisfy the constraints, the processing circuit is configured to generate an additional candidate set of operating parameters of the two or more of the HVAC devices.

In one or more embodiments, in response to determining that the predicted thermodynamic states satisfy the constraints, the processing circuit is configured to determine whether a sum of thermal energy loads of the two or more of the HVAC devices operating according to the candidate set of operating parameters is substantially equal to the target thermal energy load of the branch.

In one or more embodiments, in response to determining that the sum of the thermal energy loads of the two or more of the HVAC devices is not substantially equal to the target thermal energy load, the processing circuit is configured to generate an additional candidate set of operating parameters of the two or more of the HVAC devices.

In one or more embodiments, the processing circuit is configured to determine whether the sum of the thermal energy loads of the two or more of the HVAC devices is substantially equal to the target thermal energy load based on the ratio of the flow rates and outlet temperatures of liquid or gas from the two or more of the HVAC devices.

In one or more embodiments, the processing circuit is configured to generate the candidate set of operating parameters of the two or more of the HVAC devices by generating a matrix including: a first element associated with a first HVAC device of the two or more of the HVAC devices, a second element associated with a second HVAC device of the two or more of the HVAC devices, a third element equal to a negative of the first element, and a fourth element equal to a negative of the second element. The first element and the second element may be disposed in a diagonal direction of the matrix, and the third element and the fourth element may be disposed in a column direction of the matrix.

In one or more embodiments, the processing circuit is configured to generate the candidate set of operating parameters of the two or more of the HVAC devices by generating a first vector including outlet temperatures of liquid or gas from the two or more of the HVAC devices, generating a second vector including thermal energy loads of the two or more of the HVAC devices, and performing a least squares optimization of the matrix, the first vector, and the second vector to obtain the candidate set of operating parameters.

Various embodiments of a method for an energy plant including heating, ventilation, air conditioning (HVAC) devices are disclosed herein. The method includes determining a ratio of flow rates between two or more of the HVAC devices of the energy plant connected in parallel with each other in a branch. The method further includes generating a candidate set of operating parameters of the two or more of the HVAC devices according to the ratio of the flow rates. The method further includes predicting thermodynamic states of the two or more of the HVAC devices operating according to the candidate set of operating parameters. The method further includes determining whether the predicted thermodynamic states satisfy constraints of the two or more of the HVAC devices. The method further includes determining whether the predicted thermodynamic states satisfy a target thermal energy load of the branch based on the ratio of the flow rates. The method further includes operating the energy plant according to the candidate set of operating parameters, in response to determining that the predicted thermodynamic states satisfy the constraints and the target thermal energy load.

In one or more embodiments, the constraints include a first temperature threshold of one of the two or more of the HVAC devices and a second temperature threshold of the one of the two or more of the HVAC devices. The first temperature threshold may be higher than the second temperature threshold.

In one or more embodiments, the method includes generating an additional candidate set of operating parameters of the two or more of the HVAC devices, in response to determining that the predicted thermodynamic states do not satisfy the constraints.

In one or more embodiments, the method includes determining whether a sum of thermal energy loads of the two or more of the HVAC devices operating according to the candidate set of operating parameters is substantially equal to the target thermal energy load of the branch, in response to determining that the predicted thermodynamic states satisfy the constraints.

In one or more embodiments, the method includes generating an additional candidate set of operating parameters of the two or more of the HVAC devices, in response to determining that the sum of the thermal energy loads of the two or more of the HVAC devices is not substantially equal to the target thermal energy load.

In one or more embodiments, determining whether the sum of the thermal energy loads of the two or more of the HVAC devices is within the target thermal energy load is based on the ratio of the flow rates and outlet temperatures of liquid or gas from the two or more of the HVAC devices.

In one or more embodiments, generating the candidate set of operating parameters of the two or more of the HVAC devices includes generating a matrix including a first element associated with a first HVAC device of the two or more of the HVAC devices, a second element associated with a second HVAC device of the two or more of the HVAC devices, a third element equal to a negative of the first element, and a fourth element equal to a negative of the second element. The first element and the second element may be disposed in a diagonal direction of the matrix, and the third element and the fourth element may be disposed in a column direction of the matrix.

In one or more embodiments, generating the candidate set of operating parameters of the two or more of the HVAC devices includes: generating a first vector including outlet temperatures of liquid or gas from the two or more of the HVAC devices, generating a second vector including thermal energy loads of the two or more of the HVAC devices, and performing a least squares optimization of the matrix, the first vector, and the second vector to obtain the candidate set of operating parameters.

Various embodiments of a non-transitory computer readable medium storing instructions for an energy plant are disclosed herein. The instructions when executed by a processor cause the processor to: determine a ratio of flow rates between two or more of heating, ventilation, air conditioning (HVAC) devices of the energy plant in a branch, generate a candidate set of operating parameters of the two or more of the HVAC devices according to the ratio of the flow rates, predict thermodynamic states of the two or more of the HVAC devices operating according to the candidate set of operating parameters, determine whether the predicted thermodynamic states satisfy constraints of the two or more of the HVAC devices, determine whether the predicted thermodynamic states satisfy a target thermal energy load of the branch based on the ratio of the flow rates, and operate the energy plant according to the candidate set of operating parameters, in response to determining that the predicted thermodynamic states satisfy the constraints and the target thermal energy load.

In one or more embodiments, the constraints include a first temperature threshold of one of the two or more of the HVAC devices and a second temperature threshold of the one of the two or more of the HVAC devices. The first temperature threshold may be higher than the second temperature threshold.

In one or more embodiments, the instructions when executed by the processor to generate the candidate set of operating parameters of the two or more of the HVAC devices further cause the processor to generate a matrix including: a first element associated with a first HVAC device of the two or more of the HVAC devices, a second element associated with a second HVAC device of the two or more of the HVAC devices, a third element equal to a negative of the first element, and a fourth element equal to a negative of the second element. The first element and the second element disposed in a diagonal direction of the matrix, and the third element and the fourth element may be disposed in a column direction of the matrix.

In one or more embodiments, the instructions when executed by the processor to generate the candidate set of operating parameters of the two or more of the HVAC devices further cause the processor to generate a first vector including outlet temperatures of liquid or gas from the two or more of the HVAC devices, generate a second vector including thermal energy loads of the two or more of the HVAC devices, and perform a least squares optimization of the matrix, the first vector, and the second vector to obtain the candidate set of operating parameters according.

DETAILED DESCRIPTION

Overview

Referring generally to the FIGURES, disclosed herein are systems and methods for determining a set of operating parameters for operating a HVAC system in view of physical constrains of the HVAC system.

Disclosed herein are related to a system, a method, and a non-transitory computer readable medium for operating an energy plant (also referred to as "a central plant") in view of physical constraints of the HVAC system. In one aspect, a system determines a ratio of flow rates between two or more of the HVAC devices connected in parallel with each other. The system generates a candidate set of operating parameters of the two or more of the HVAC devices according to the ratio of the flow rates. The system predicts thermodynamic states of the two or more of the HVAC devices operating according to the candidate set of operating parameters. The system determines whether the predicted thermodynamic states satisfy physical constraints of the two or more HVAC devices. Examples of the constraints include allowable temperature ranges, pressure ranges, and flow of liquid or gas of the HVAC devices. The system further determines whether the predicted thermodynamic states of the two or more of the HVAC devices satisfy a target thermal energy load of the branch according to the ratio of the flow rate. The system operates the energy plant according to the candidate set of operating parameters, in response to determining that the predicted thermodynamic states satisfy the constraints and the target thermal energy load.

Advantageously, the disclosed embodiments allow the HVAC system to be operated in a manner that satisfies the physical constraints and a target thermal energy load of a branch. In one aspect, operating a HVAC device in a manner that breaches the physical constraints may cause damage to the HVAC device. For example, operating a device at a temperature beyond its allowable temperature range may temporarily or permanently damage the HVAC device. By determining operating parameters in view of the physical constraints of the HVAC devices, damage to the HVAC devices can be reduced or obviated. Moreover, thermal energy load may be distributed according to physical connections or schematic arrangements of the HVAC devices.

Building and HVAC System

Figure 1:
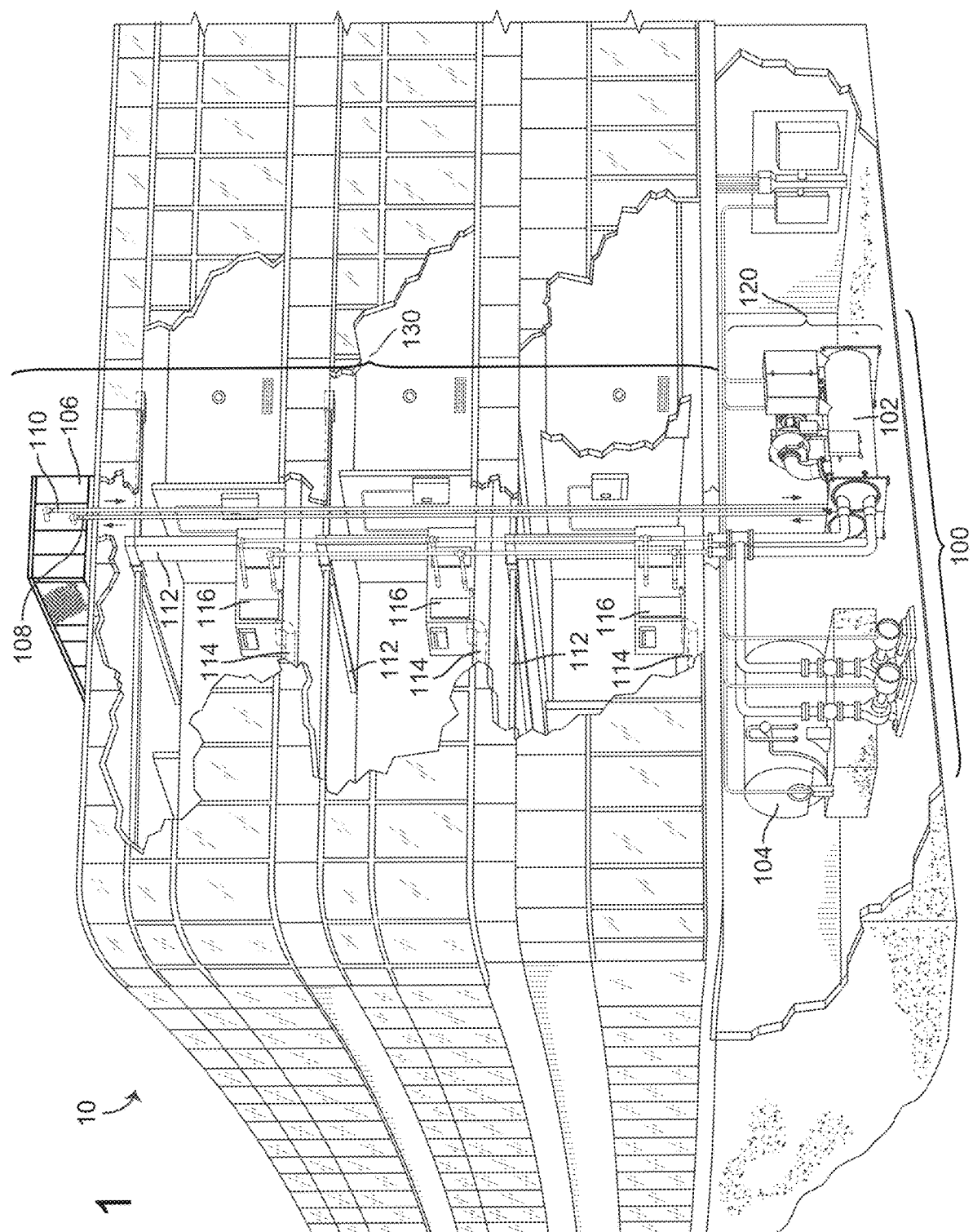
FIG. 1 is a drawing of a building equipped with an HVAC system, according to some embodiments.
Figure 2:
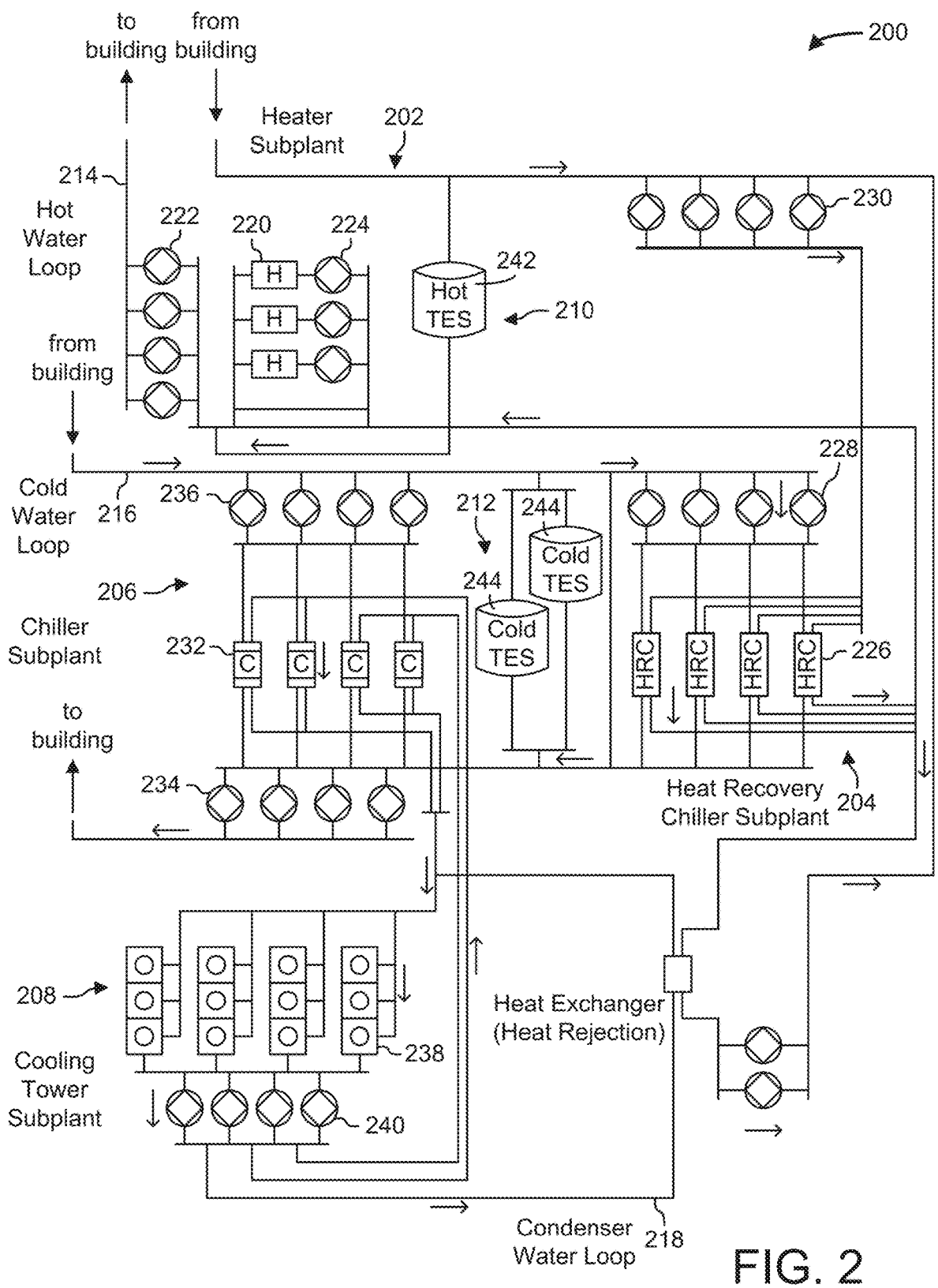
FIG. 2 is a schematic of a waterside system, which can be used as part of the HVAC system of FIG. 1, according to some embodiments.
Figure 3:
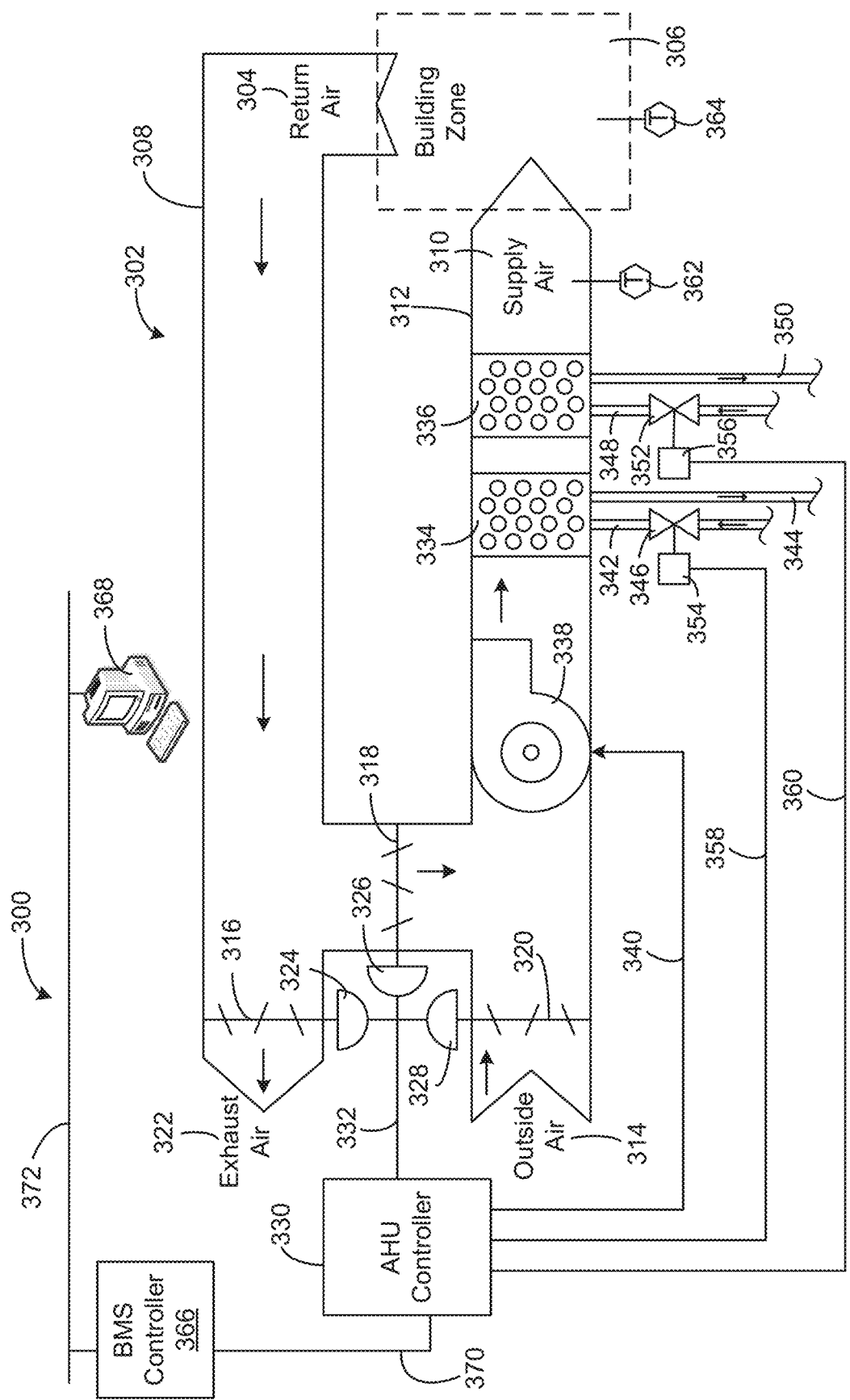
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Example Climate Control System

Figure 4:
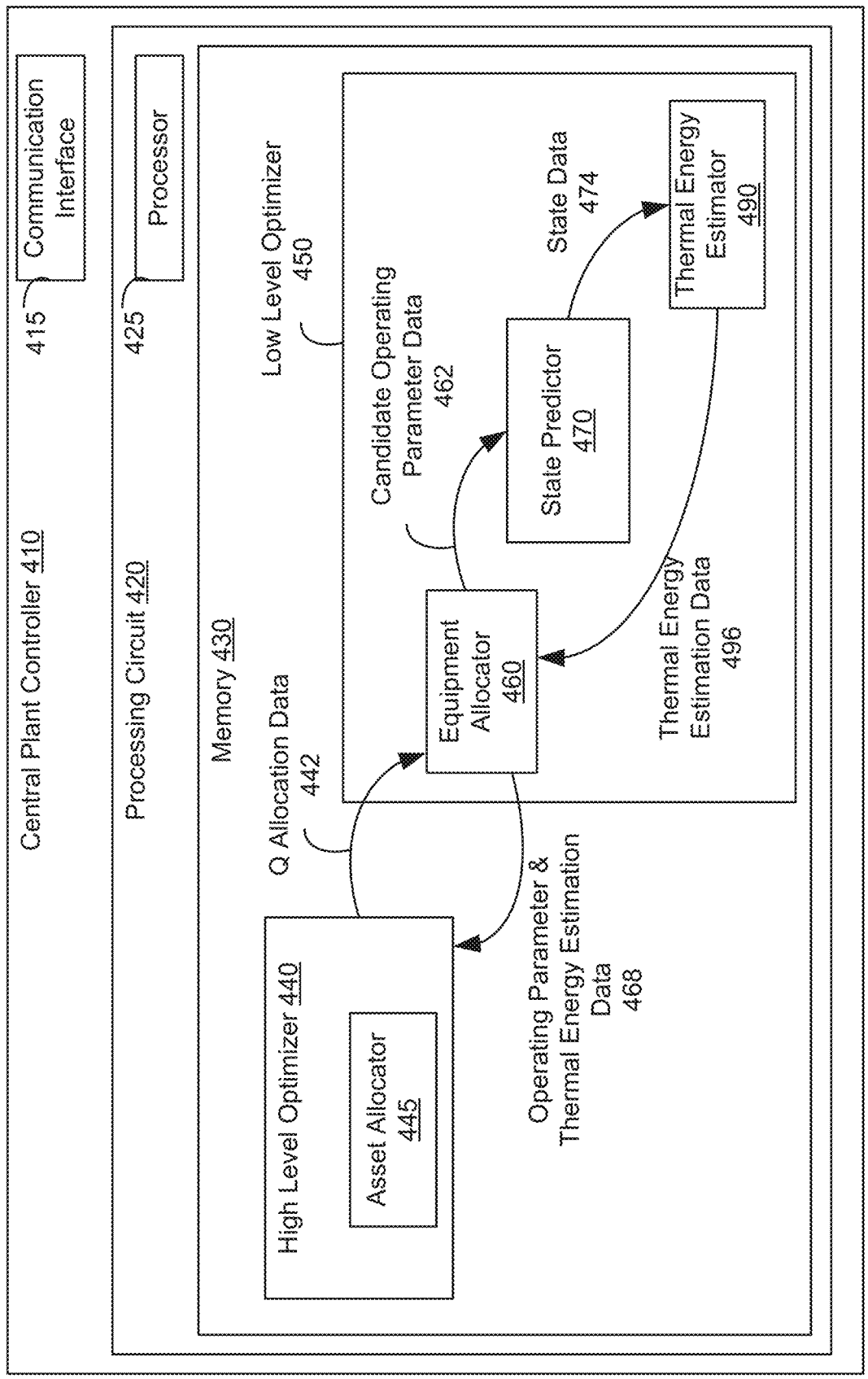
FIG. 4 is a block diagram of a central plant controller which can be used to control the HVAC system of FIG. 1, the waterside system of FIG. 2, and/or the airside system of FIG. 3, according to some embodiments.

Referring to FIG. 4, illustrated is a block diagram of a central plant controller 410, according to some embodiments. In some embodiments, the central plant controller 410 is part of the HVAC system 100 of FIG. 1. Alternatively, the central plant controller 410 is coupled to the HVAC system 100 through a communication link. The central plant controller 410 may be the AHU controller 330 of FIG. 3, or a combination of the BMS controller 366 and the AHU controller 330 of FIG. 3. In one configuration, the central plant controller 410 includes a communication interface 415, and a processing circuit 420. These components operate together to determine a set of operating parameters for operating various HVAC devices of the HVAC system 100. In some embodiments, the central plant controller 410 includes additional, fewer, or different components than shown in FIG. 4.

The communication interface 415 facilitates communication of the central plant controller 410 with other HVAC devices (e.g., heaters, chillers, air handling units, pumps, fans, thermal energy storage, etc.). The communication interface 415 can be or include wired or wireless communications interfaces (e.g., jacks, antennas, transmitters, receivers, transceivers, wire terminals, etc.). In various embodiments, communications via the communication interface 415 can be direct (e.g., local wired or wireless communications) or via a communications network (e.g., a WAN, the Internet, a cellular network, etc.). For example, the communication interface 415 can include an Ethernet/USB/RS232/RS485 card and port for sending and receiving data through a network. In another example, the communication interface 415 can include a Wi-Fi transceiver for communicating via a wireless communications network. In another example, the communication interface 415 can include cellular or mobile phone communication transceivers.

The processing circuit 420 is a hardware circuit executing instructions to determine a set of parameters for operating HVAC devices of the HVAC system 100. In one embodiment, the processing circuit 420 includes a processor 425, and memory 430 storing instructions (or program code) executable by the processor 425. The memory 430 may be any non-transitory computer readable medium. In one embodiment, the instructions executed by the processor 425 cause the processor 425 to form software modules including a high level optimizer 440, and a low level optimizer 450. The high level optimizer 440 may determine how to distribute thermal energy loads across HVAC devices (e.g., subplants, chillers, heaters, valves, etc.) for each time step in the prediction window, for example, to minimize the cost of energy consumed by the HVAC devices. The low level optimizer 450 may determine how to operate each subplant according to the thermal energy loads determined by the high level optimizer 440. In other embodiments, the processor 425 and the memory 430 may be omitted, and the high level optimizer 440 and the low level optimizer 450 may be implemented as hardware modules by a reconfigurable circuit (e.g., field programmable gate array (FPGA)), an application specific integrated circuit (ASIC), or any circuitries, or a combination of software modules and hardware modules.

In one implementation, the high level optimizer 440 determines thermal energy loads of HVAC devices of the HVAC system 100, and generates Q allocation data 442 indicating a target set of the determined thermal energy loads. The high level optimizer 440 may provide the Q allocation data 442 to the low level optimizer 450. In return, the high level optimizer 440 may receive, from the low level optimizer 450, operating parameter and thermal energy estimation data 468 indicating a set of operating parameters to operate HVAC devices of the HVAC system 100, predicted thermal energy loads when operating the HVAC system 100 according to the set of operating parameters, or both. Based on the operating parameter and thermal energy estimation data 468, the high level optimizer 440 can operate the HVAC system 100 accordingly or generate different Q allocation data 442 for further optimization. The high level optimizer 440 and the low level optimizer 450 may operate together online in real time, or offline at different times.

In one or more embodiments, the high level optimizer 440 includes an asset allocator 445 that determines a distribution of thermal energy loads of the HVAC devices of the HVAC system 100 based on a predicted thermal energy load of the HVAC system 100. In some embodiments, the asset allocator 445 determines the optimal load distribution by minimizing the total operating cost of HVAC system 100 over the prediction time window. In one aspect, given a predicted thermal energy load $\hat{\ell}_k$ and utility rate information received through a user input or automatically determined by a scheduler (not shown), the asset allocator 445 may determine a distribution of the predicted thermal energy load $\hat{\ell}_k$ across subplants to minimize the cost. The asset allocator 445 generates the Q allocation data 442 indicating the predicted loads $\hat{\ell}_k$ of different HVAC devices of the HVAC system 100 and provides the Q allocation data 442 to the low level optimizer 450.

In some embodiments, distributing thermal energy load includes causing TES subplants to store thermal energy during a first time step for use during a later time step. Thermal energy storage may advantageously allow thermal energy to be produced and stored during a first time period when energy prices are relatively low and subsequently retrieved and used during a second time period when energy prices are relatively high. The high level optimization may be different from the low level optimization in that the high level optimization has a longer time constant due to the thermal energy storage provided by TES subplants. The high level optimization may be described by the following equation:

$$\theta_{HL}^* = \arg\min_{\theta_{HL}} J_{HL}(\theta_{HL}) \qquad \text{Eq. (1)}$$

where $\theta_{HL}^*$ contains the optimal high level decisions (e.g., the optimal load $\dot{Q}$ for each of subplants) for the entire prediction period and $J_{HL}$ is the high level cost function.

To find the optimal high level decisions $\theta_{HL}^*$, the asset allocator 445 may minimize the high level cost function $J_{HL}$. The high level cost function $J_{HL}$ may be the sum of the economic costs of each utility consumed by each of subplants for the duration of the prediction time period. For example, the high level cost function $J_{HL}$ may be described using the following equation:

$$J_{HL}(\theta_{HL}) = \sum_{k=1}^{n_h} \sum_{i=1}^{n_s} [\sum_{j=1}^{n_u} t_s \cdot c_{jk} u_{jik}(\theta_{HL})] \qquad \text{Eq. (2)}$$

where $n_h$ is the number of time steps k in the prediction time period, $n_s$ is the number of subplants, $t_s$ is the duration of a time step, $c_{jk}$ is the economic cost of utility j at a time step k of the prediction period, and $u_{jik}$ is the rate of use of utility j by subplant i at time step k. In some embodiments, the cost function $J_{HL}$ includes an additional demand charge term such as:

$$w_d c_{demand} \max_{n_h}(u_{elec}(\theta_{HL}), u_{max,ele}) \qquad \text{Eq. (3)}$$

where $w_d$ is a weighting term, $c_{demand}$ is the demand cost, and the max( ) term selects the peak electricity use during the applicable demand charge period.

In some embodiments, the high level optimization performed by the high level optimizer 440 is the same or similar to the high level optimization process described in U.S. patent application Ser. No. 14/634,609 filed Feb. 27, 2015 and titled "High Level Central Plant Optimization," which is incorporated by reference herein.

The low level optimizer 450 receives the Q allocation data 442 from the high level optimizer 440, and determines operating parameters (e.g., capacities or setpoints) of the HVAC devices of the HVAC system 100. In one or more embodiments, the low level optimizer 450 includes an equipment allocator 460, a state predictor 470, and a thermal energy estimator 490. Together, these components operate to determine a set of operating parameters, for example, rendering a set of predicted thermal energy loads of the HVAC system 100 close to a target set of target thermal energy loads indicated by the Q allocation data 442, and generate operating parameter data indicating the determined set of operating parameters. In some embodiments, the low level optimizer 450 includes different, more, or fewer components, or includes components in different arrangements than shown in FIG. 4.

In one configuration, the equipment allocator 460 receives the Q allocation data 442 from the high level optimizer 440, and generates candidate operating parameter data 462 indicating a set of candidate operating parameters of HVAC devices of the HVAC system 100. The state predictor 470 receives the candidate operating parameter data 462 and predicts thermodynamic states of the HVAC system 100 at various locations for the set of candidate operating parameters. The state predictor 470 generates state data 474 indicating the predicted thermodynamic states, and provides the state data 474 to the thermal energy estimator 490. The thermal energy estimator 490 predicts, based on the state data 474, a set of thermal energy loads of the HVAC devices operating according to the set of candidate operating parameters, and generates the thermal energy estimation data 496 indicating a set of the predicted thermal energy loads for a candidate set of setpoints (or operating parameters). The equipment allocator 460 may repeat the process with different sets of candidate operating parameters to obtain different sets of thermal energy loads of the HVAC devices operating according to different sets of candidate operating parameters, and select a set of operating parameters rendering a set predicted thermal energy loads close to the target set of target thermal energy loads. The equipment allocator 460 may generate the operating parameter and thermal energy estimation data 468 indicating (i) the selected set of operating parameters and (ii) predicted thermal energy loads when operating according to the selected set of operating parameters, and provide the operating parameter and thermal energy estimation data 468 to the high level optimizer 440.

The equipment allocator 460 is a component that interfaces with the high level optimizer 440. In one aspect, the equipment allocator 460 receives the Q allocation data, and determines a candidate set of operating parameters of HVAC devices of the HVAC system 100. For example, the equipment allocator 460 determines that a first chiller is assigned to operate with a first range of thermal energy load and a second chiller is assigned to operate with a second range of thermal energy load based on the Q allocation data. In this example, the equipment allocator 460 may determine that operating parameters (e.g., between 30% to 50% capacity) of the first chiller can achieve the first range of thermal energy load and operating parameters (e.g., between 60~65% capacity) of the second chiller can achieve the second range of thermal energy load. Examples of other operating parameters include a target input pressure value, a target output pressure value, a target input mass flow value, a target output mass flow value, a target input enthalpy value, a target output enthalpy value, etc. From different combinations of operating parameters of the first chiller and the second chiller, the equipment allocator 460 selects a candidate set of operating parameters (e.g., 45% capacity of the first chiller and 60% capacity of the second chiller). Additionally, the equipment allocator 460 generates the candidate operating parameter data 462 indicating the selected candidate set of operating parameters, and provides the candidate operating parameter data 462 to the state predictor 470.

The state predictor 470 predicts an operating condition of the HVAC system 100 based on a set of operating parameters of the HVAC system 100 as indicated by the candidate operating parameter data 462. The operating condition of the HVAC system 100 includes thermodynamic states at various locations of the HVAC system 100. Examples of thermodynamic states include input pressure value, output pressure value, input mass flow value, output mass flow value, input enthalpy value, output enthalpy value, etc. In one approach, predicting thermodynamic states of the HVAC system 100 includes applying the set of operating parameters to a linear solver and a non-linear solver. Generally, the non-linear solver consumes a large amount of resources (e.g., processor threads and storage capacity) to obtain a solution. In one or more embodiments, the state predictor 470 reduces a number of unknown thermodynamic states to be predicted based on schematic arrangements of HVAC devices of the HVAC system 100, and may further reduce the number of unknown thermodynamic states to be predicted by propagating known thermodynamic states based on the operating parameters using the linear solver. Advantageously, a fewer number of unknown thermodynamic states can be determined by the non-linear solver, thereby improving efficiency of predicting the thermodynamic states for the set of operating parameters. The state predictor 470 generates state data 474 indicating the predicted thermodynamic states for the candidate set of operating parameters, and provides the state data 474 to the thermal energy estimator 490.

The thermal energy estimator 490 predicts a set of predicted thermal energy loads of the HVAC devices based on the state data 474. In one approach, the thermal energy estimator 490 determines, for each HVAC device, a corresponding thermal energy load based on thermodynamic states (e.g., pressure values, mass flow values, enthalpy values, etc.) and an operating parameter (e.g., capacity or setpoints) of the HVAC device. The thermal energy estimator 490 may generate the thermal energy estimation data 496 indicating the set of predicted thermal energy loads of the HVAC devices, and provide the thermal energy estimation data 496 to the equipment allocator 460.

In some embodiments, the equipment allocator 460 determines operating parameters of HVAC devices in view of physical constraints of the HVAC devices. In one approach, the equipment allocator 460 determines a ratio of flow rates between two or more of the HVAC devices connected in parallel with each other. The ratio of flow rates may be determined based on schematic arrangements of the HVAC devices in a branch. The equipment allocator 460 may generate a candidate set of operating parameters of the two or more of the HVAC devices, according to thermal energy load identified by the Q allocation data 442. The equipment allocator 460 may generate the candidate set of operating parameters of the two or more of the HVAC devices, according to the ratio of flow rates. The equipment allocator 460 may generate the candidate operating parameter data 462 indicating the candidate set of operating parameters, and provide the candidate operating parameter data 462 to the state predictor 470. The state predictor 470 may predict thermodynamic states of the HVAC devices based on the candidate set of operating parameters.

The equipment allocator 460 may determine whether the predicted thermodynamic states satisfy constraints of the HVAC devices. The equipment allocator 460 may also determine whether the predicted thermodynamic states satisfy a target thermal energy load of the HVAC devices in the branch according to the ratio of flow rates. The equipment allocator 460 may generate an additional candidate set of operating parameters, if the physical constraints or flow rates are not satisfied. The equipment allocator 460 may select, from a plurality of candidate sets of operating parameters rendering thermodynamic states of HVAC devices to satisfy the constraints and the flow rate, a set of operating parameters rendering the lowest power consumption. The equipment allocator 460 generates the operating parameter and thermal energy estimation data 468 indicating the selected set of operating parameters, and provides the operating parameter and thermal energy estimation data 468 to the high level optimizer 440. Detailed implementations and operations of generating candidate operating parameters in view of the physical constraints and the ratio of flow rates are provided below with respect to FIGS. 5 through 7.

Figure 5:
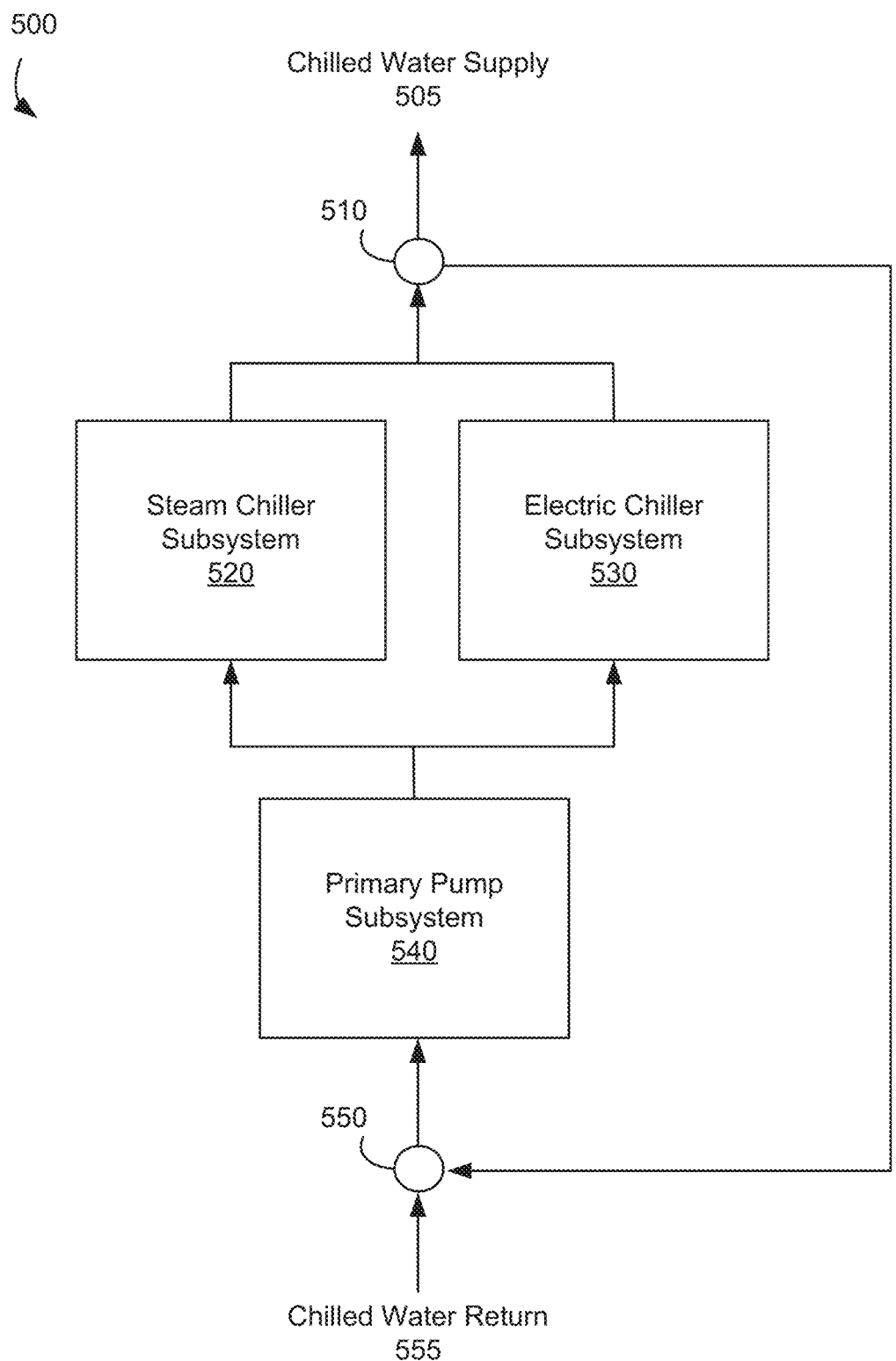
FIG. 5 is a block diagram of example devices of the HVAC system, according to some embodiments.

Referring to FIG. 5, illustrated is a block diagram of example devices of the HVAC system in a branch 500, according to some embodiments. One aspect of the low level optimizer 450 is to dispatch loads indicated by the operating parameter and thermal energy estimation data 468 in a similar manner to the high level request indicated by the Q allocation data 442, while maintaining the correct mix of temperature and load distribution in consideration of physical constraints of HVAC devices. The operation may be performed on the branch 500, which is a distinct path through the plant from the return header to the supply header. On this branch 500, there can be many collections of subsystems 520, 530, 540. The subsystems 520, 530, 540 involved in this optimization may be different chiller subsystems.

In the example shown in FIG. 5, the branch 500 includes a steam chiller subsystem 520 and an electric chiller subsystem 530. In one example, the primary pump subsystem 540 is coupled to the steam chiller subsystem 520 and the electric chiller subsystem 530. The steam chiller subsystem 520 and the electric chiller subsystem 530 are coupled to each other in parallel. The outputs of liquid or gas from the subsystems 520, 530 are combined by a combiner 510, and the combined outputs are provided as a chilled water supply 505. A combiner 550 is coupled to an input of the primary pump subsystem 540 to form a loop. The combiner 550 may combine liquid or gas from chilled water return 555 and feedback (or bypass) from the combiner 510, and supply the combined liquid or gas to the primary pump subsystem 540. The high level optimizer 440 dispatches a load to each of these subsystems, and the low level optimizer 450 ensures that the dispatch is physically possible without damaging equipment.

Figure 6:
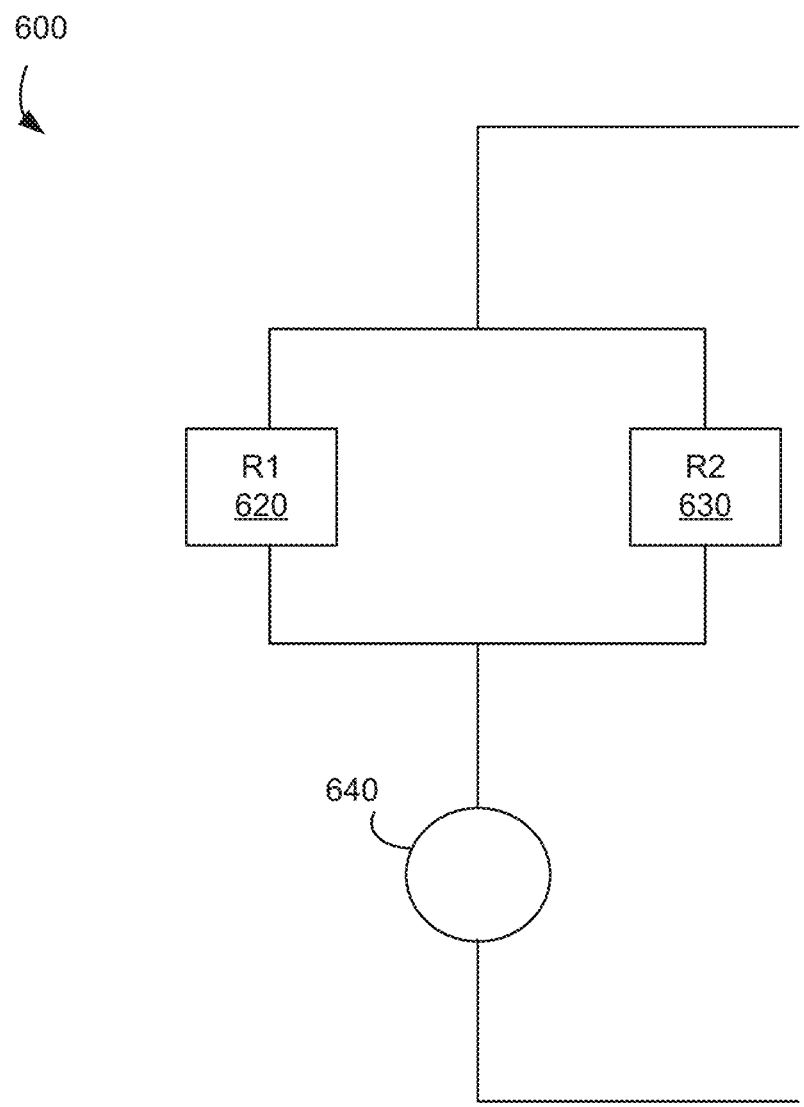
FIG. 6 illustrates an equivalent circuit diagram of the example devices of the HVAC system shown in FIG. 5, according to some embodiments.

Referring to FIG. 6, illustrated is an equivalent circuit diagram 600 of the example devices of the HVAC system in the branch 500 shown in FIG. 5. The resistors 620, 630 may correspond to the steam chiller subsystem 520 and the electric chiller subsystem 530 of FIG. 5, respectively. The voltage supply 640 may correspond to the primary pump subsystem 540 of FIG. 5. In this example, the ratio of currents between each resistor 620, 630 is fixed by its resistance. The hydraulic representation has a similar resistance, typically labeled as the Cv value. The relationship between flow and pressure is given by the following equation.

$$\omega = C_v \sqrt{\Delta P} \qquad \text{Eq. (4)}$$

where $\omega$ is the flow of the water, $C_v$ is the hydraulic resistance, and $\Delta P$ is the pressure difference from outlet to inlet.

The Cv of a chiller is accepted as fixed by its design flow and $\Delta P$, and the pressure drop across chillers in parallel are identical. This makes the ratio of flows through each chiller fixed by the Cv values. The equation for the flow ratio (or a ratio of flow rates) is given below.

$$FR = \frac{C_{v_i}}{\Sigma C_v} \qquad \text{Eq. (5)}$$

where FR is ratio of the flow rates.

For a given branch load, the load can be distributed to each subsystem using the flow ratio, however this can vary greatly from the high level dispatch. In one aspect, load of HVAC devices determined by the low level optimizer 450 may be close to the load dispatched by the high level optimizer 440, while still obeying physical constraints through a least squares optimization below.

$$\min\|Q_{HL} - Q_{LL}\| \text{ s.t. } \Sigma Q_{LL} = \Sigma Q_{HL} \qquad \text{Eq. (6)}$$

where $Q_{HL}$ is a thermal energy load dispatched by the high level optimizer 440 and $Q_{LL}$ is a thermal energy load of HVAC devices operating according to operating parameters computed by the low level optimizer 450.

A degree of freedom that the low level optimizer 450 is able to manipulate within a branch to try to optimize the solution is the exiting temperatures of each chiller subsystem. This is because the supply and return temperatures are fixed separately from this process by the nonlinear setpoint optimization. The generic equation for load of a chiller is as follows.

$$Q = \dot{m} c_p \Delta T \qquad \text{Eq. (7)}$$

where $\dot{m}$ is the water mass flow rate, $c_p$ is the specific heat capacity of water, and $\Delta T$ is the temperature difference from outlet to inlet.

This can be rewritten using relevant variables as follows.

$$Q_{Subsystem} = \omega_{Subsystem} C_p \rho (T_{Outlet} - T_{Return}) \qquad \text{Eq. (8)}$$

where $Q_{Subsystem}$ is the thermal energy load of a subsystem in a branch, $\omega_{subsystem}$ is a flow rate of water of the subsystem, $c_p$ is the specific heat capacity of water, p is density of water, $T_{Outlet}$ is the outlet temperature of the subsystem, and $T_{Return}$ is the return temperature of the subsystem.

The unknown that is not explicitly available in this equation is the flow of the subsystem. However, due to the constraints on the least squares optimization, the low level optimizer 450 can implicitly determine the flow of the subsystem using the following equations.

$$Q_{Branch} = Q_{Subsystems} = \omega_{Branch} C_p \rho (T_{Supply} - T_{Return}) \qquad \text{Eq. (9)}$$

Since $Q_{Branch}$ is determined by the least squares optimization, the flow of the branch can be determined. Moreover, the flow of the subsystem can be calculated using the previously calculated flow ratio, as shown below.

$$\omega_{Subsystem} = \omega_{Branch} FR_{Subsystem} \qquad \text{Eq. (10)}$$

The low level optimizer 450 may create the following matrix and vectors, and perform least square optimization to obtain one or more candidate sets of operating parameters.

$$A = \begin{bmatrix} \omega_1 C_P \rho & \cdots & 0 & -\omega_1 C_P \rho \\ \vdots & \ddots & \vdots & \vdots \\ 0 & \cdots & \omega_n C_P \rho & -\omega_n C_P \rho \end{bmatrix} \quad \text{Eq. (11)}$$

$$X = \begin{bmatrix} T_{Out_1} \\ \vdots \\ T_{Out_n} \\ T_{Return} \end{bmatrix} \quad \text{Eq. (12)}$$

$$b = \begin{bmatrix} Q_1 \\ \vdots \\ Q_n \end{bmatrix} \quad \text{Eq. (13)}$$

Chillers have an additional constraint given by the minimum and maximum chilled water temperatures that they are able to produce. Too low of a temperature and freezing can occur, too high of a temperature and the compressor begins to run inefficiently. Additionally, $T_{Return}$ is fixed, so bounds can be created as shown below.

$$lb = \begin{bmatrix} T_{Out_1, Min} \\ \vdots \\ T_{Out_n, Min} \\ T_{Return} \end{bmatrix} \quad \text{Eq. (14)}$$

$$ub = \begin{bmatrix} T_{Out_1, Max} \\ \vdots \\ T_{Out_n, Max} \\ T_{Return} \end{bmatrix} \quad \text{Eq. (15)}$$

The equality constraint may be created in order to ensure there is no unmet or excess load generated by low level optimizer 450. The equation can be simplified to exclude many of the constants by following the equations below.

$$\Sigma Q_{LL} = Q_{Branch} \quad \text{Eq. (16)}$$

$$\Sigma \rho C_P \omega_{Branch} FR_i(T_{Out,i} - T_{Return}) = \rho C_P \omega_{Branch}(T_{Supply} - T_{Return}) \quad \text{Eq. (17)}$$

$$\Sigma FR_i T_{Out,i} = T_{Supply} \quad \text{Eq. (18)}$$

$$Aeq = [FR_1 \ldots FR_n] \quad \text{Eq. (19)}$$

$$beq = [T_{Supply}] \quad \text{Eq. (20)}$$

where $T_{Supply}$ is the supply temperature of the branch.

Advantageously, the disclosed cascaded optimization performed by the low level optimizer 450 allows the high level dispatch by the high level optimizer 440 to be observed as closely as possible without risking violation of physical plant constraints. This prevents damage to the equipment, increases credibility of the algorithm with customers and stakeholders, and reduces the cost as much as possible.

Figure 7:
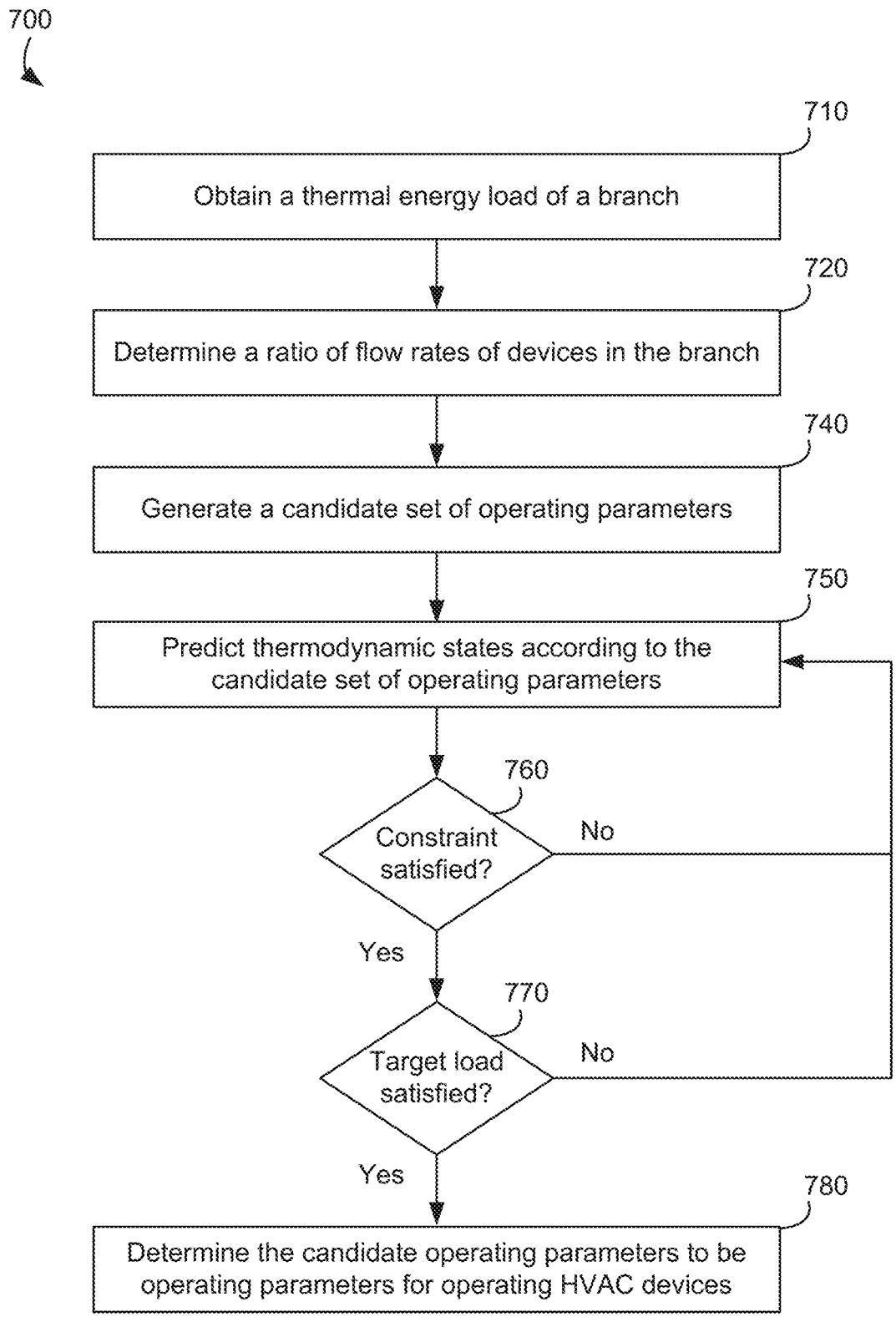
FIG. 7 is a flow chart illustrating a process of determining operating parameters according to constraints and a target thermal energy load of HVAC device connected with each in parallel in a branch, according to some embodiments.

Referring to FIG. 7, illustrated is a flow chart illustrating a process 700 of determining operating parameters according to constraints and flow rate of HVAC device connected with each in parallel, according to some embodiments. The process 700 may be performed by the low level optimizer 450 of FIG. 4. In some embodiments, the process 700 may be performed by other entities. In some embodiments, the process 700 may include additional, fewer, or different steps than shown in FIG. 7.

The low level optimizer 450 obtains a thermal energy load of a branch (step 710). The low level optimizer 450 may receive the thermal energy load of the branch from the high level optimizer 440.

The low level optimizer 450 determines a ratio of flow rates of devices in the branch (step 720). The low level optimizer 450 may determine the ratio of the flow rates based on a schematic arrangement of the HVAC devices in the branch. For example, the HVAC devices are coupled to each other in parallel in the branch. The low level optimizer 450 may determine the ratio of flow rates of HVAC device according to a heat capacity of the HVAC device with respect to a total heat capacity of HVAC devices in the parallel connection.

The low level optimizer 450 generates a candidate set of operating parameters (step 740). The low level optimizer 450 predicts thermodynamic states according to the candidate set of operating parameters (step 750). In one approach, the low level optimizer 450 generates a matrix including elements corresponding to respective HVAC devices disposed in a diagonal direction as in Eq. (11). Each of the elements may be operating parameters, thermodynamic states, or any combination of them of a respective HVAC device. For example, each of the elements may be a product of a flow rate of water a HVAC device, a heat capacity of the HVAC device, and density of water. In one aspect, the flow rate is determined based on the ratio of the flow rates of the HVAC devices in the branch. The matrix may also include a column (or a row) including negative values of the elements in the diagonal direction. Remaining elements of the matrix may be zero. The low level optimizer 450 may also generate a vector including outlet temperatures of liquid or gas from the HVAC devices, and another vector including thermal energy loads. The low level optimizer 450 may perform least square optimization on the matrix and the vectors to generate one or more candidate sets of operating parameters, and predict thermodynamic states according to the candidate set of operating parameters.

The low level optimizer 450 determines whether physical constraints are satisfied (step 760). In one approach, the low level optimizer 450 determines whether thermodynamic states of HVAC devices operating according to the candidate set of operating parameters satisfy the physical constraints. For example, a HVAC device may have an upper temperature threshold (e.g., 100 F.°) and a lower temperature threshold (e.g., 40 F.°). In this example, a temperature of the HVAC device between the upper temperature threshold and the lower temperature threshold may be considered to satisfy the physical constraint of the HVAC device. Similarly, a temperature of the HVAC device beyond the upper temperature threshold and the lower temperature threshold may be considered not to satisfy the physical constraint of the HVAC device. Response to determining that the physical constraints are not satisfied, the low level optimizer 450 returns to step 750, and generates an additional candidate set of operating parameters.

Responsive to determining that the physical constrains are satisfied, the low level optimizer 450 determines whether the target load is satisfied (step 770). For example, the low level optimizer 450 determines whether insufficient load or excess load beyond threshold amount is generated based on the ratio of the flow rates. In one approach, the low level optimizer 450 determines products of outlet temperatures and respective ratio of flow rates, and determines whether the sum of the products is substantially equal to the supply temperature of the branch. The supply temperature may correspond to the target load. If the sum is substantially equal to the supply temperature (e.g., the sum is within a predetermined amount from the supply temperature), then the low level optimizer 450 determines that the target load is satisfied. If the sum is not substantially equal to the supply temperature (e.g., the sum is beyond the predetermined amount from the supply temperature), then the low level optimizer 450 determines that the target load is not satisfied. Response to determining that the target load is not satisfied, the low level optimizer 450 returns to step 750, and generates an additional candidate set of operating parameters.

Response to determining that the target load is satisfied, the low level optimizer 450 determines the candidate operating parameters to be operating parameters for operating the HVAC devices (step 780). Hence, the HVAC devices may be operated according to the determined set of operating parameters satisfying the physical constraints and the target load.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for an energy plant including heating, ventilation, air conditioning (HVAC) devices, the controller comprising:
   a processing circuit comprising a processor and memory storing instructions executed by the processor, the processing circuit configured to:
      determine flow rates of gas or liquid through a plurality of the HVAC devices of the energy plant connected in parallel with each other in a branch such that outputs of the plurality of the HVAC devices combine to form a combined output of the branch;
      use the flow rates and a constraint on the combined output of the branch to generate a candidate set of operating parameters indicating target thermodynamic states other than flow rate of the outputs of the plurality of the HVAC devices, the candidate set of operating parameters predicted to result in the combined output of the branch having a thermodynamic state other than flow rate that satisfies the constraint on the combined output of the branch when the outputs of the plurality of the HVAC devices combine according to the flow rates to form the combined output of the branch; and
      operate the energy plant according to the candidate set of operating parameters by controlling the plurality of the HVAC devices to produce the outputs using the target thermodynamic states indicated by the candidate set of operating parameters.

2. The controller of claim 1, wherein:
   the outputs of the plurality of the HVAC devices comprise heated or chilled fluids supplied by the plurality of the HVAC devices;
   the candidate set of operating parameters indicate target supply temperatures for the heated or chilled fluids;
   the combined output comprises a combined heated or chilled fluid formed by combining the heated or chilled fluids generated by the plurality of the HVAC devices; and
   the constraint indicates a target temperature for the combined heated or chilled fluid.

3. The controller of claim 1, wherein generating the candidate set of operating parameters comprises:
   predicting thermal energy loads of the plurality of the HVAC devices predicted to result from operating the energy plant according to the candidate set of operating parameters; and
   adjusting the candidate set of operating parameters to reduce a difference between the predicted thermal energy loads and target thermal energy loads for the plurality of the HVAC devices.

4. The controller of claim 1, wherein generating the candidate set of operating parameters comprises:
  predicting thermal energy loads of the plurality of the HVAC devices predicted to result from operating the energy plant according to the candidate set of operating parameters; and
  adjusting the candidate set of operating parameters such that a sum of the predicted thermal energy loads is substantially equal to a target thermal energy load of the branch.

5. The controller of claim 1, wherein determining the flow rates through the plurality of the HVAC devices comprises:
  obtaining hydraulic resistance values for the plurality of the HVAC devices; and
  calculating, for each HVAC device of the plurality of the HVAC devices, a flow rate ratio based on a hydraulic resistance value for the HVAC device and a summation of the hydraulic resistance values for the plurality of the HVAC devices.

6. The controller of claim 4, wherein the processing circuit is configured to determine whether the sum of the predicted thermal energy loads of the plurality of the HVAC devices is substantially equal to the target thermal energy load based on a ratio of the flow rates and outlet temperatures of liquid or gas from the plurality of the HVAC devices.

7. The controller of claim 1, wherein the processing circuit is configured to generate the candidate set of operating parameters indicating the outputs of the plurality of the HVAC devices by:
  generating a matrix including:
    a first element associated with a first HVAC device of the plurality of the HVAC devices,
    a second element associated with a second HVAC device of the plurality of the HVAC devices, the first element and the second element disposed in a diagonal direction of the matrix,
    a third element equal to a negative of the first element, and
    a fourth element equal to a negative of the second element, the third element and the fourth element disposed in a column direction of the matrix.

8. The controller of claim 7, wherein the processing circuit is configured to generate the candidate set of operating parameters indicating the outputs of the plurality of the HVAC devices by:
  generating a first vector including outlet temperatures of liquid or gas from the plurality of the HVAC devices;
  generating a second vector including thermal energy loads of the plurality of the HVAC devices; and
  performing a least squares optimization of the matrix, the first vector, and the second vector to obtain the candidate set of operating parameters.

9. A method for an energy plant including heating, ventilation, air conditioning (HVAC) devices, the method including:
  determining flow rates of gas or liquid through a plurality of the HVAC devices of the energy plant connected in parallel with each other in a branch such that outputs of the plurality of the HVAC devices combine to form a combined output of the branch;
  using the flow rates and a constraint on the combined output of the branch to generate a candidate set of operating parameters indicating target thermodynamic states other than flow rate of the outputs of the plurality of the HVAC devices, the candidate set of operating parameters predicted to result in the combined output of the branch having a thermodynamic state other than flow rate that satisfies the constraint on the combined output of the branch when the outputs of the plurality of the HVAC devices combine according to the flow rates to form the combined output of the branch; and
  operating the energy plant according to the candidate set of operating parameters by controlling the plurality of the HVAC devices to produce the outputs using the target thermodynamic states indicated by the candidate set of operating parameters.

10. The method of claim 9, wherein:
  the outputs of the plurality of the HVAC devices comprise heated or chilled fluids supplied by the plurality of the HVAC devices;
  the candidate set of operating parameters indicate target supply temperatures for the heated or chilled fluids;
  the combined output comprises a combined heated or chilled fluid formed by combining the heated or chilled fluids generated by the plurality of the HVAC devices; and
  the constraint indicates a target temperature for the combined heated or chilled fluid.

11. The method of claim 9, generating the candidate set of operating parameters comprises:
  predicting thermal energy loads of the plurality of the HVAC devices predicted to result from operating the energy plant according to the candidate set of operating parameters; and
  adjusting the candidate set of operating parameters to reduce a difference between the predicted thermal energy loads and target thermal energy loads for the plurality of the HVAC devices.

12. The method of claim 9, wherein generating the candidate set of operating parameters comprises:
  predicting thermal energy loads of the plurality of the HVAC devices predicted to result from operating the energy plant according to the candidate set of operating parameters; and
  adjusting the candidate set of operating parameters such that a sum of predicted thermal energy loads is substantially equal to a target thermal energy load of the branch.

13. The method of claim 9, wherein determining the flow rates through the plurality of the HVAC devices comprises:
  obtaining hydraulic resistance values for the plurality of the HVAC devices; and
  calculating, for each HVAC device of the plurality of the HVAC devices, a flow rate ratio based on a hydraulic resistance value for the HVAC device and a summation of the hydraulic resistance values for the plurality of the HVAC devices.

14. The method of claim 12, wherein determining whether the sum of the predicted thermal energy loads of the plurality of the HVAC devices is within the target thermal energy load is based on a ratio of the flow rates and outlet temperatures of liquid or gas from the plurality of the HVAC devices.

15. The method of claim 9, wherein generating the candidate set of operating parameters indicating the outputs of the plurality of the HVAC devices includes:
  generating a matrix including:
    a first element associated with a first HVAC device of the plurality of the HVAC devices,
    a second element associated with a second HVAC device of the plurality of the HVAC devices, the first element and the second element disposed in a diagonal direction of the matrix, a third element equal to a negative of the first element, and a fourth element equal to a negative of the second element, the third element and the fourth element disposed in a column direction of the matrix.

16. The method of claim 15, wherein generating the candidate set of operating parameters indicating the outputs of the plurality of the HVAC devices includes:

generating a first vector including outlet temperatures of liquid or gas from the plurality of the HVAC devices;

generating a second vector including thermal energy loads of the two or more plurality of the HVAC devices; and performing a least squares optimization of the matrix, the first vector, and the second vector to obtain the candidate set of operating parameters.

17. A non-transitory computer readable medium storing instructions when executed by a processor cause the processor to:

determine, for each of a plurality of heating, ventilation, air conditioning (HVAC) devices of an energy plant, a flow rate ratio based on a hydraulic resistance value for said each of the plurality of HVAC devices and a summation of the hydraulic resistance values for the plurality of the HVAC devices, the plurality of HVAC devices connected in parallel with each other in a branch such that outputs of the plurality of the HVAC devices combine to form a combined output of the branch;

use the flow rate ratios of the plurality of HVAC devices and a constraint on the combined output of the branch to generate a candidate set of operating parameters indicating target thermodynamic states other than flow rate of the outputs of the plurality of the HVAC devices, the candidate set of operating parameters predicted to result in the combined output of the branch having a thermodynamic state other than flow rate that satisfies the constraint on the combined output of the branch when the outputs of the plurality of the HVAC devices combine according to the flow rates to form the combined output of the branch; and operate the energy plant according to the candidate set of operating parameters by controlling the plurality of the HVAC devices to produce the outputs using the target thermodynamic states indicated by the candidate set of operating parameters.

18. The non-transitory computer readable medium of claim 17, wherein:

the outputs of the plurality of the HVAC devices comprise heated or chilled fluids supplied by the plurality of the HVAC devices;

the candidate set of operating parameters indicate target supply temperatures for the heated or chilled fluids;

the combined output comprises a combined heated or chilled fluid formed by combining the heated or chilled fluids generated by the plurality of the HVAC devices; and the constraint indicates a target temperature for the combined heated or chilled fluid.

19. The non-transitory computer readable medium of claim 17, wherein the instructions when executed by the processor to generate the candidate set of operating parameters indicating the outputs of the plurality of the HVAC devices further cause the processor to:

generate a matrix including:
a first element associated with a first HVAC device of the plurality of the HVAC devices,
a second element associated with a second HVAC device of the plurality of the HVAC devices, the first element and the second element disposed in a diagonal direction of the matrix,
a third element equal to a negative of the first element, and
a fourth element equal to a negative of the second element, the third element and the fourth element disposed in a column direction of the matrix.

20. The non-transitory computer readable medium of claim 19, wherein the instructions when executed by the processor to generate the candidate set of operating parameters indicating the outputs of the plurality of the HVAC devices further cause the processor to:

generate a first vector including outlet temperatures of liquid or gas from the plurality of the HVAC devices;

generate a second vector including thermal energy loads of the plurality of the HVAC devices; and perform a least squares optimization of the matrix, the first vector, and the second vector to obtain the candidate set of operating parameters according.

21. The controller of claim 1, wherein the target thermodynamic states of the outputs of the plurality of the HVAC devices and the thermodynamic state of the combined output of the branch comprise at least one of temperature, enthalpy, or pressure.

* * * * *